US008291796B2

(12) United States Patent
Taira et al.

(10) Patent No.: US 8,291,796 B2
(45) Date of Patent: Oct. 23, 2012

(54) TWO-AXIS MACHINE TOOL

(75) Inventors: Hiroshi Taira, Inuyama (JP); Yasuhiko Fukami, Inuyama (JP)

(73) Assignee: Murata Machinery Ltd., Kyoto (JP)

( * ) Notice: Subject to any disclaimer, the term of this patent is extended or adjusted under 35 U.S.C. 154(b) by 0 days.

(21) Appl. No.: 13/238,027

(22) Filed: Sep. 21, 2011

(65) Prior Publication Data

US 2012/0006163 A1    Jan. 12, 2012

Related U.S. Application Data

(63) Continuation of application No. PCT/JP2010/053612, filed on Mar. 5, 2010.

(30) Foreign Application Priority Data

Mar. 27, 2009   (JP) .................................. 2009-078294

(51) Int. Cl.
*B23B 17/00*   (2006.01)
*B23B 3/30*   (2006.01)

(52) U.S. Cl. .......................................... 82/150; 82/903

(58) Field of Classification Search ..................... 82/150, 82/903, 149; 408/234; 409/235; 29/402.18
See application file for complete search history.

(56) References Cited

U.S. PATENT DOCUMENTS

| 2,621,552 | A | * | 12/1952 | Montanus et al. | ............... | 82/149 |
| 4,197,629 | A | * | 4/1980 | Reese et al. | ....................... | 29/560 |
| 4,218,825 | A | * | 8/1980 | Asakura et al. | ................. | 33/504 |
| 4,981,056 | A | * | 1/1991 | Brown et al. | .................... | 82/149 |
| 5,988,959 | A | * | 11/1999 | Sugata | .......................... | 409/141 |
| 6,178,856 | B1 | * | 1/2001 | Caddaye et al. | ................. | 82/117 |
| 7,861,627 | B2 | * | 1/2011 | Saito et al. | ...................... | 82/149 |
| 2007/0062348 | A1 | * | 3/2007 | Saito et al. | ...................... | 82/149 |

FOREIGN PATENT DOCUMENTS

| DE | 103 18 349 A1 | 11/2004 |
| DE | 10 2006 050 426 A1 | 4/2008 |
| JP | 61-004634 A | 1/1986 |
| JP | 2606511 B2 | 5/1997 |
| JP | 11-058172 A | 3/1999 |
| JP | 2004-098234 A | 4/2004 |
| JP | 2004-268204 A | 9/2004 |
| JP | 2007-021606 A | 2/2007 |
| JP | 4206157 B2 | 1/2009 |

OTHER PUBLICATIONS

Official Communication issued in International Patent Application No. PCT/JP2010/053612, mailed on Jun. 1, 2010.
English translation of Official Communication issued in corresponding International Application PCT/JP2010/053612, mailed on Nov. 24, 2011.
Official Communication issued in corresponding European Patent Application No. 10755831.4, mailed on Aug. 28, 2012.

* cited by examiner

*Primary Examiner* — Will Fridie, Jr.
(74) *Attorney, Agent, or Firm* — Keating & Bennett, LLP

(57) ABSTRACT

A two axis machine tool suppresses vibrations between two processing machines and provides a self vibration suppressing effect resulting from increased rigidity and increased mass. The two axis machine tool includes first and second separate and independent machine beds and processing machines mounted respectively on the first and second machine beds, and the first and second machine beds are connected together through vibration suppressing units. Each of the vibration suppressing units includes a viscoelastic body sandwiched between first and second plate members secured respectively to the first and second machine beds.

6 Claims, 3 Drawing Sheets

TWO-AXIS MACHINE TOOL

CROSS REFERENCE TO THE RELATED APPLICATION

This application is based on and claims priority to Japanese patent application No. 2009-78294, filed Mar. 27, 2009, the entire disclosure of which is herein incorporated by reference as a part of this application.

BACKGROUND OF THE INVENTION

1. Field of the Invention

The present invention relates to a two-axis machine tool such as, for example, a double axle lathing tool, which includes two left and right machine beds separate from and independent of each other and a processing machine mounted on each of the left and right machine beds.

2. Description of the Related Art

The two-axis machine tool such as, for example, a double axle lathing tool has been known, in which two machine beds, each having a processing machine mounted thereon, are completely separated from each other in order to avoid propagation of vibrations from one of the processing machines to the other thereof during processing. In such a case, propagation of vibrations from one of the processing machines to the other thereof takes place only through the floor, on which the two axis machine tool is placed, and, therefore, the vibrations so propagated are minimal. However, it has been found that in the case of the processing machines mounted on the respective machine beds separate from each other, the effect of attenuating the vibrations, which is afforded by the rigidity and the increased mass and is available particularly where the processing machines are mounted on a common machine bed, is reduced.

As another method to avoid the propagation of vibrations between the processing machines, a structure has been known in which the respective machine beds are integrated together into a common machine bed without being separated and a vibration attenuating element is instead added to the single machine bed itself, but no sufficient effect has yet been obtained to avoid the propagation of vibrations between the processing machines.

As a further method to avoid the propagation of vibrations between the processing machines, Japanese Patent No. 4206157 discloses respective machine beds for two processing machines are separated from each other and made independent of each other, with a packing or elastic material interposed between those separated machine beds, and a flat plate disposed so as to straddle those separated machine beds is firmly bolted at its opposite ends to those separated machine beds.

In the case of the structure in which the two machine beds are connected together by the packing and the flat plate, since the flat plate is bolted to the machine beds, vibrations occurring in one of the processing machines tend to be transmitted to the other thereof through a path defined by the bolt fastened to one of the machine beds, the flat plate and the bolt fastened to the other of the machine beds. Because of this, a satisfactory effect of suppressing the propagation of vibrations cannot be obtained.

SUMMARY OF THE INVENTION

Preferred embodiments of the present invention provide a two axis machine tool capable of accomplishing simultaneously an excellent effect of suppressing the propagation of vibrations between processing machines and a self vibration suppressing effect achieved by rigidity and increased mass.

Preferred embodiments of the present invention also provide a two axis machine tool of the kind referred to above, in which the vibratory propagation suppressing effect and the self vibration suppressing effect are further increased.

Preferred embodiments of the present invention also enable the self vibration suppressing effect and the vibratory propagation suppressing effect to be effective according to the direction in which the vibrations are generated.

According to a preferred embodiment of the present invention, a two axis machine tool includes first and second machine beds independent of each other; first and second processing machines mounted on the first and second machine beds, respectively; and a vibration suppressing unit connecting the first and second machine beds with each other. The vibration suppressing unit includes a viscoelastic body and is arranged to suppress vibrations.

According to a preferred embodiment of the present invention, although the first and second machine beds including the first and second processing machines mounted thereon, respectively, are separated from and independent of each other, the first and second machine beds are connected together by the vibration suppressing unit and, therefore, as compared with the case in which the first and second processing machines are not connected together in which the first and second machine beds are independent of each other, the rigidity of the machine beds is increased and the mass to be vibrated is also increased, making it possible to provide a vibration suppressing effect. For this reason, vibrations occurring in the processing machines, which generate self vibrations, and vibrations in the machine beds including the processing machines mounted thereon can be suppressed.

Also, although the first and second machine beds are preferably connected together, such connection is accomplished by the use of the vibration suppressing unit utilizing the viscoelastic body and, therefore, propagation of vibrations generated in and by one of the processing machines to the other of the processing machines can be effectively blocked by the viscoelastic body. Accordingly, the excellent effect of suppressing the propagation of the vibrations between the processing machines and the self vibration suppressing effect resulting from the increased rigidity and the increased mass can be obtained simultaneously. As a result, various and high grade processes can be performed, ranging from an intermittent cutting to a high precision cutting.

In a preferred embodiment of the present invention, the first and second machine beds may be disposed on left and right sides of the machine tool, respectively. The vibration suppressing unit may include a first plate member connected at one end to the first machine bed and at the other extending therefrom towards a center portion, and a second plate member connected at one end to the second machine bed and at the other end extending therefrom towards a center portion and including an overlap region that overlaps another end of the first plate member while being spaced in a forward and rearward direction. The viscoelastic body is fixed to the first and second plate members while being sandwiched between the first and second plates and preferably has an elongated shape longer in a leftward and rightward direction than in the forward and rearward direction.

Due to the vibration suppressing unit having a sandwich structure with the viscoelastic body intervening between the first and second plate members, even when vibrations acting in the leftward and rightward direction and also in the vertical direction act on one of the plate members, for example, the first plate member, such vibrations can be effectively attenuated by the viscoelastic body and will not be propagated to the second plate member. For this reason, a further desirable vibration propagation suppressing effect can be obtained. Also, since each of the viscoelastic bodies has such a shape that is longer in the leftward and rightward direction than in the forward and rearward direction, connection of the first and second machine beds through the viscoelastic body is effective not only to enhance the self vibration suppressing effect resulting from the increased rigidity and the increased mass, but also to make it possible to obtain the effect or preventing the propagation of the vibrations in the leftward and rightward direction and also in the vertical direction.

In a preferred embodiment of the present invention, the two axle machine tool may be a parallel two axle lathing tool, in which case the processing machine on each of the first and second machine beds includes a spindle extending in the forward and rearward direction.

Since in the lathing tool, vibrations tend to be generated between the rotating spindle in each of the first and second processing machines and the work supported thereby, the direction in which the vibrations are generated lies in a direction perpendicular or substantially perpendicular to the longitudinal axis of the spindle and parallel or substantially parallel to the direction of arrangement of the tool and the spindle. For this reason, if the spindle in each of the first and second processing machines is of a type extending in the forward and rearward direction, the direction in which the vibrations are generated lies mainly in the leftward and rightward direction. Accordingly, if the first and second machine beds are connected together through the vibration suppressing unit including the viscoelastic body, the self vibration suppressing effect resulting from the increased rigidity and the effect of preventing the vibration propagation will become high with respect to the vibrations acting in the leftward and rightward direction. As a result of the excellent vibration suppressing effects relative to the direction in which the vibrations are generated, a vibration propagating effect can be obtained, and a further effective self vibration suppressing effect and a further effective vibration propagation suppressing effect can be obtained.

In particular, if the vibration suppressing unit has the sandwich structure as hereinbefore described, the direction in which the vibration suppressing effect and the effect of preventing the vibration propagation can be obtained, and the direction, in which the vibrations are generated by the processing machines match with each other and, therefore, the self vibration suppressing effect and the vibration propagation preventing effect can be further effectively enhanced.

In a preferred embodiment of the present invention, the vibration suppressing unit may be disposed to bridge over front surfaces of the first and second machine beds and also, over rear surfaces of the first and second machine beads. With this construction, a high vibration suppressing effect can be obtained.

In a preferred embodiment of the present invention, two of the vibration suppressing units are preferably disposed to bridge over front surfaces of the first and second machine beds and are separated by a distance from each other in a vertical direction, in which case the upper vibration suppressing unit has a vertical width greater than that of the lower vibration suppressing unit. Since in the two axis machine tool, the processing of a work takes place in the front surface of the machine tool, vibrations generated incident to the processing tend to be more substantial on the side of the front surface than on the side of a rear surface. Also, those vibrations are more considerable at a location spaced from a floor surface than at a location close to the floor surface. Therefore, with the above described construction, the vibrations can be effectively suppressed.

The above and other elements, features, steps, characteristics and advantages of the present invention will become more apparent from the following detailed description of the preferred embodiments with reference to the attached drawings.

BRIEF DESCRIPTION OF THE DRAWINGS

In any event, the present invention will become more clearly understood from the following description of preferred embodiments thereof, when taken in conjunction with the accompanying drawings. However, the preferred embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, in which:

DETAILED DESCRIPTION OF THE PREFERRED EMBODIMENTS

Figure 1:
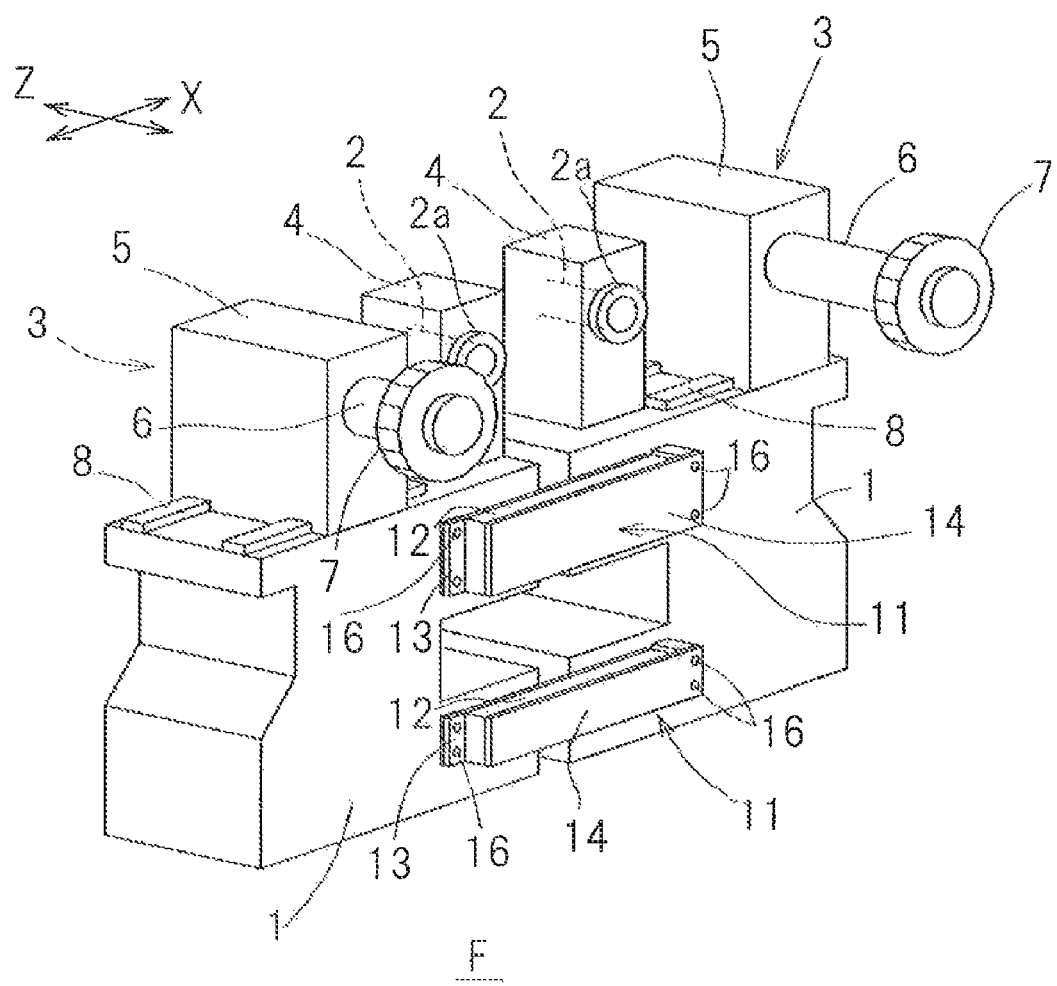
FIG. 1 is a perspective view showing a two axis machine tool according to a preferred embodiment of the present invention.

Preferred embodiments of the present invention will now be described in detail with reference to FIG. 1 to FIGS. 3A and 3B. In particular, FIG. 1 illustrates a perspective view of a two axis machine tool according to a preferred embodiment of the present invention. The illustrated two axis machine tool preferably is a parallel two axle lathing tool including respective processing machines mounted on left and right, or first and second, machine beds 1 separate from and independent of each other. Each processing machine includes a spindle 2 extending in a forward and rearward direction (Z-axis direction) and first and second cutting mechanisms 3, each including a cutter support 7. Both of the left and right machine beds 1 are fixedly placed on a floor surface F in a factory. The left and right machine beds 1 may be fixedly placed on the floor surface through a common base intervening between the floor surface and respective bottoms of the left and right machine beds 1.

Figure 2A:
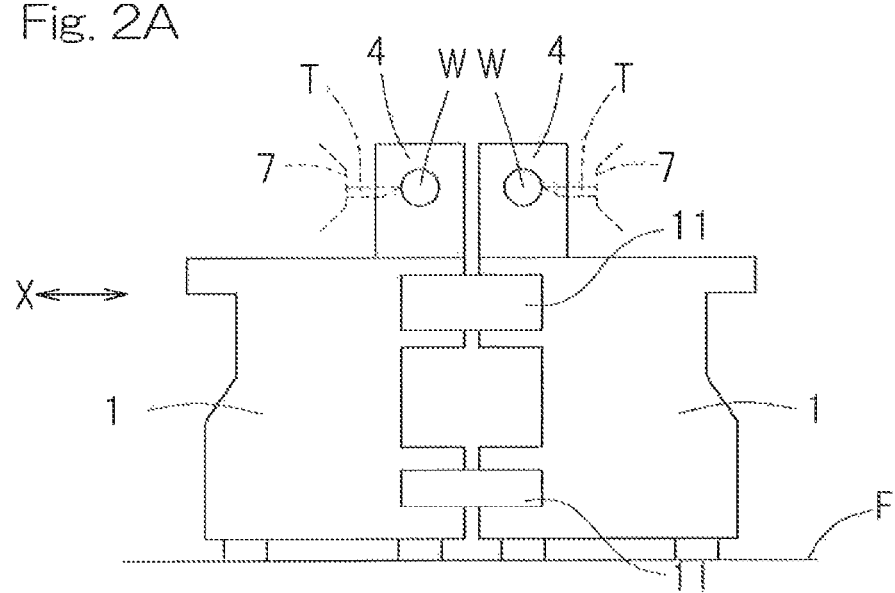
FIG. 2A is a front elevational view showing a schematic structure of the two axis machine tool.

The spindle or the main shaft 2 in each of the cutting mechanisms 3 on the respective machine beds 1 is rotatably supported by a first or second headstock 4 fixedly mounted on the corresponding machine bed 1 and includes a spindle chuck 2a mounted on a front end thereof for holding a work W best shown in FIG. 2A. The spindle 2 is driven by a spindle drive motor (not shown) installed in the respective headstock 4. The first and second headstocks 4 on the respective machine beds 1 are mounted on top portions of the machine beds 1 that are held adjacent to each other.

Each of the cutting mechanisms 3 includes a tailstock 5 arranged laterally of the adjacent spindle 2, a turret shaft 6 supported by the tailstock 5 so as to extend parallel to the spindle 2 in a forward and rearward direction, and the corresponding cutter support 7 preferably in the form of a polygonal turret mounted on a free end of the turret shaft 6. As best shown in FIG. 2A, a plurality of types of tools T are mounted on an outer periphery of the cutter support 7 in each of the cutting mechanisms 3. The turret shaft 6 is rotatably supported by the corresponding tailstock 5 and, by an indexed rotation of the turret shaft 6, one of the tools T that is to be used in cutting can be selectively brought to a position so as to confront the spindle 2. The tailstock 5 supports the turret shaft 6 for reciprocal movement in a direction close towards and away from the corresponding tailstock 5 or as to permit the tailstock 5 to assume a vertically double staged structure so that an upper stage portion of the tailstock 5 can be reciprocally movable relative to a lower stage portion of the tailstock 5 such that the cutter support 7 can be movable in a direction forwards or rearwards.

Figure 2B:
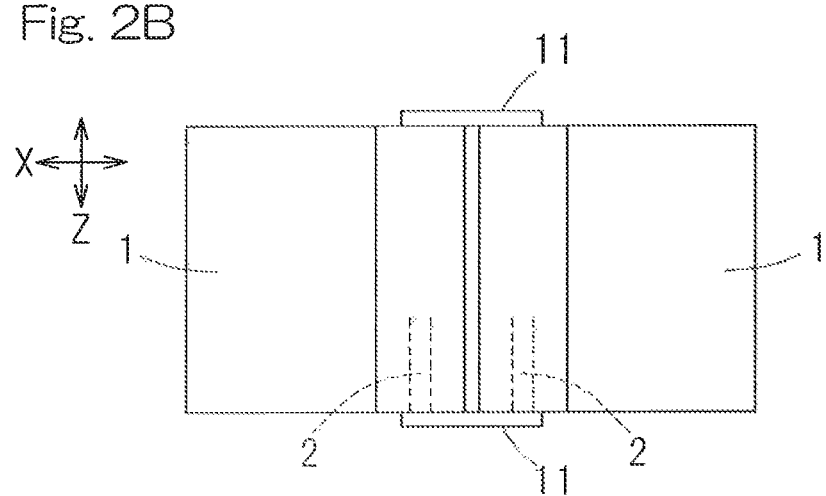
FIG. 2B is a top plan view showing the schematic structure of the two axis machine tool.
Figure 2C:
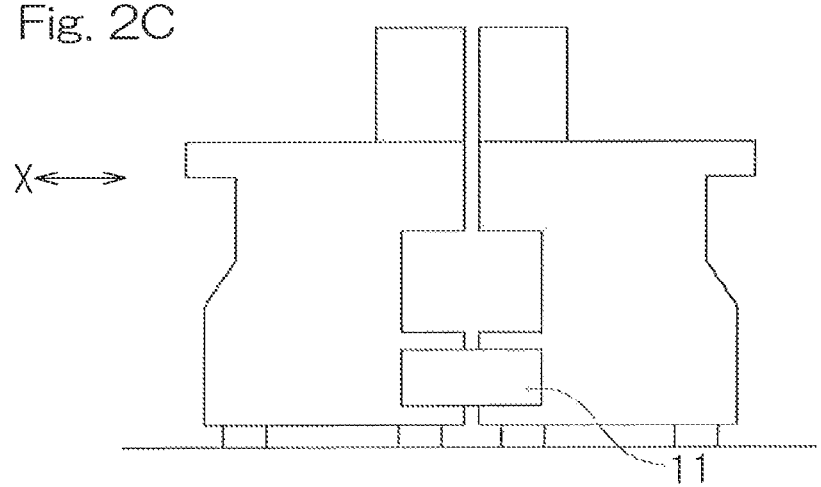
FIG. 2C is a rear view showing the schematic structure of the two axis machine tool.

In the two axis machine tool having such a basic structure as hereinabove described, the left and right machine beds 1 are connected by and through a single or a plurality of, for example, three, vibration suppressing units 11. Each of the vibration suppressing units 11 includes a viscoelastic body 12, with which an effect of suppressing vibrations is achieved. As shown in FIGS. 2A, 2B and 2C in a front elevational view, a top plan view and a rear view, respectively, the left and right machine beds 1 are connected together at two locations, i.e., upper and lower locations of the front of the two axis machine tool through the two vibration suppressing units 11 each of which bridges over the front surfaces of the two machine beds 1, which are spaced a distance from each other in a vertical direction, and at one location of the rear of the two axis machine tool through one vibration suppressing unit 11 which bridges over the rear surfaces of the two machine beds 1.

Figure 3A:
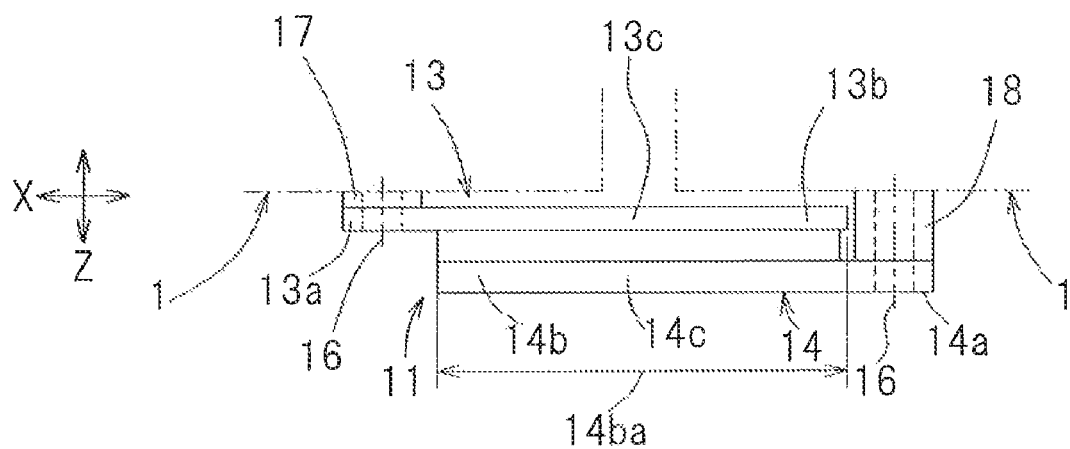
FIG. 3A is a schematic top plan view showing a vibration suppressing unit included in the two axis machine tool.
Figure 3B:
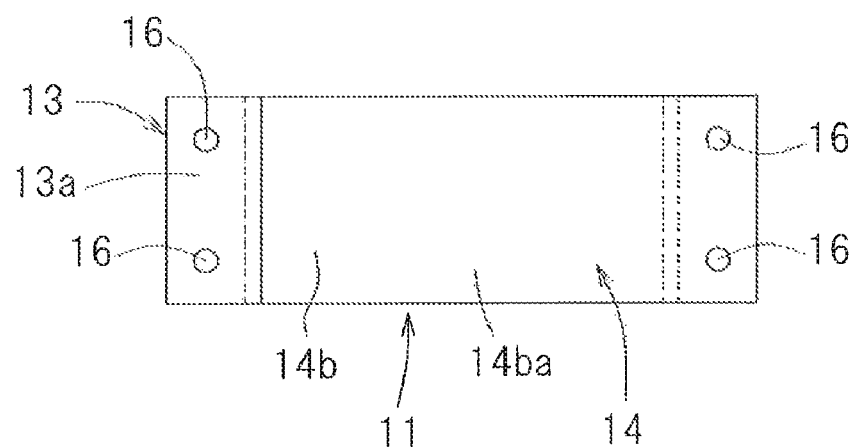
FIG. 3B is a schematic front elevational view of the vibration suppressing unit.

Referring now to FIGS. 3A and 3B, which illustrate a top plan view and a front elevational view of the details of each of the vibration suppressing units 11, each vibration suppressing unit 11 includes first and second, or left and right, plate members 13 and 14 with the viscoelastic body 12 interposed between the plate members 13 and 14 and thus provides a sandwiched structure in which the viscoelastic body 12 is fixed in position as bonded to the plate members 13 and 14 while being sandwiched therebetween. Each of the two plate members 13 and 14 is prepared from a metal plate such as, for example, a steel plate and preferably has a substantially rectangular shape when viewed from front. The first or left plate member 13 preferably includes a first end 13a secured to the left machine bed 1 and a second end 13b extending towards a position adjacent a center portion. In the instance as shown, the second end 13b of the first plate member 13 terminates at a position forwardly of the right machine bed 1.

On the other hand, the second plate member 14 includes a first end 14a secured to the right machine bed 1 and a second end 14b extending towards a position adjacent a center portion. A section of the second plate member 14, including the second end 14b and a generally intermediate portion 14c thereof, and a section of the first plate member 13, similarly including the second end 13b and a generally intermediate portion 13c thereof are overlapped one above the other and spaced a distance from each other in the forward and rearward direction, that is, in a direction perpendicular or substantially perpendicular to front surfaces of the machine beds 1 to thereby define an overlap region 14ba.

If the first and second plate members 13 and 14 have respective lengths smaller than those shown, only the second end 13b of the first plate member 13 and the second end 14b of the second plate member 14 will spacedly overlap with each other in the forward and rearward direction perpendicular or substantially perpendicular to the front surfaces of the machine beds 1. In other words, the first and second plate members 13 and 14 have at least their second ends 13b and 14b spacedly overlapped with each other in the forward and rearward direction.

The first and second plate members 13 and 14 are secured to the front or rear surfaces of the left and right machine beds 1 preferably by set bolts 16 with only the first ends 13a and 14a bolted thereto through respective intervening members 17 and 18. Each of the set bolts 16 is passed through a bolt insertion hole, defined in each of the first and second plate members 13 and 14 and the left and right intervening members 17 and 18, and is firmly threaded into a corresponding screw hole defined in the respective machine bed 1.

Each of the left and right intervening members 17 and 18 preferably is a plate-shaped or block-shaped metallic member such as, for example, a steel member and preferably has a substantially rectangular shape similar to the shape of the first end 13a and 14a of the first or second plate members 13 and 14. It is, however, to be noted that each of the intervening members 17 and 18 may be in the form of an annular washer provided for each of the set bolts 16.

In any event, the left and right intervening members 17 and may have respective thicknesses different from each other. Specifically, in the instance as shown, the right intervening member 18 preferably has a thickness greater than that of the left intervening member 17 by a quantity equal to the sum of the thickness of the viscoelastic body 12 and the thickness of the first plate member 13. Also, one of the first and second plate members, which is positioned closer to the adjacent machine bed 1, that is, the first plate member 13 has that section thereof, excluding the first end 13a that is secured to the adjacent machine bed 1 through the corresponding left intervening member 17, spaced a distance from the front or rear surface of the corresponding machine bed 1 because of the presence of the first intervening member 17 between the first end 13a and the corresponding machine bed 1.

The viscoelastic body 12 intervening between the first and second plate members 13 and 14 in each of the vibration suppressing units 11 preferably has a generally elongated configuration having a greater length in a leftward and rightward direction (X-axis direction) than that in the forward and rearward direction (Z-axis direction). Although the viscoelastic body 12 may have a block shape, the present preferred embodiment of the present invention preferably includes a rectangular plate-shaped viscoelastic body 12 with its forward and rearward direction represented by the direction of thickness thereof. Also, as best shown in FIG. 3B, the viscoelastic body 12 has a length extending in the leftward and rightward direction, which is greater than the width thereof extending in the vertical direction.

The viscoelastic body 12 may be made of any suitable material provided that it has a viscoelastic property, i.e., both a viscous property and an elastic property, but is preferably made of a viscoelastic material of a kind containing a base material such as, for example, an organic polymer or the like, which defines an elastic body having a high coefficient of loss, mixed with a powder for increasing the coefficient of loss relative to vibrations. The base material referred to above may be in the form of a liquid crystal polymer or a rubber such as, for example, a butyl rubber having a high coefficient of loss. For the powder for increasing the loss coefficient, carbon black, ceramics or metal can be included in the form of a powder.

The viscoelastic body 12, although preferably included in the form of a non-layer structure, that is, a single layer structure in the illustrated preferred embodiment, may be of a layered structure including a plurality of, for example, three to five, layers laminated one above the other in a direction of thickness thereof.

According to the two axis machine tool of the structure described hereinabove, the left and right machine beds 1 have been shown and described as separate from and independent of each other, but are connected together through the vibration suppressing units 11 that, as compared with the case in which they are not connected together, a self vibration suppressing effect in each of the processing machines can be increased due to the increase in the rigidity and the increase of the mass. Also, since each of the vibration suppressing units 11 makes use of the viscoelastic body 12, propagation of vibrations, generated in one of the processing machines such as, for example, the spindles 2, to the other of the processing machines such as the spindles 2 can be advantageously and effectively suppressed by the viscoelastic bodies 12 included in the respective vibration suppressing units 11. Thus, the two axis machine tool according to the present preferred embodiment of the present invention achieves both an excellent effect of suppressing the propagation of vibrations between the processing machines and a self vibration suppressing effect brought about by the rigidity and the increased mass simultaneously. As a result, various and high grade processes can be performed, ranging from an intermittent cutting to a high precision cutting.

According to the foregoing preferred embodiment of the present invention, since each of the vibration suppressing units 11 is preferably designed and configured to have the sandwiched structure, in which the viscoelastic body 12 is sandwiched between the first and second plate members 13 and 14, even when vibrations acting in the leftward and rightward direction and also in the vertical direction are transmitted to one of the first and second plate members, for example, the first plate member 13, such vibrations are effectively attenuated by the viscoelastic body 12 before they are propagated to the other of the first and second plate members, that is, the second plate member 14. For this reason, a further excellent effect of suppressing the propagation of vibrations can be obtained. Also, since each of the viscoelastic bodies 12 in the vibration suppressing units 11 preferably has a shape elongated in the leftward and rightward direction rather than in the forward and rearward direction, connection of the left and right machine beds 1 through the viscoelastic bodies 12 allows the self vibration suppressing effect, afforded by the increased rigidity and the increased mass, to be enhanced and, also, the viscoelastic bodies 12 provide an effect of preventing the propagation of vibrations acting in the leftward and rightward direction and also in the vertical direction.

Also, since the two axis machine tool referred to in describing preferred embodiments of the present invention is a parallel two axle machine tool and since each of the processing machines mounted on the left and right machine beds 1 includes the spindle 2 extending in the forward and rearward directions, the vibrations can be further effectively suppressed. In other words, since in a lathing tool, vibrations tends to be generated as a result of contact between a work W and a tool T supported by the rotating spindles 2, the direction in which the vibrations are generated lies in a direction perpendicular or substantially perpendicular to the longitudinal axis of the spindle 2 and parallel or substantially parallel to the direction of arrangement of the tool T and the spindle 2. This direction of arrangement corresponds to the leftward and rightward direction (X-axis direction). For this reason, if the left and right machine beds 1 are connected together through the vibration suppressing unit 11 including the viscoelastic body 12, the self vibration suppressing effect resulting from the increased rigidity and the effect of preventing the vibration propagation will become high relative to the vibrations acting in the leftward and rightward direction. In particular, if the vibration suppressing unit 11 has the sandwich structure as hereinbefore described, the direction in which the vibration suppressing effect and the effect of preventing the vibration propagation can be obtained, and the direction in which the vibrations are generated by the processing machines, match with each other and, therefore, the self vibration suppressing effect and the vibration propagation preventing effect can be further effectively enhanced.

The vibration suppressing units 11 are preferably arranged in such a manner as will be described in the subsequent description. Specifically, since in the two axis machine tool, processing of the work W is carried out on the side adjacent the front surface of such machine tool, vibrations generated incident to the processing are more substantial on the front side of the machine tool than on the rear side of such machine tool. Accordingly, such vibrations can be effectively suppressed if at the front surface of the two axis machine tool, two of the vibration suppressing units 11 are disposed one above the other in a direction perpendicular or substantially perpendicular to the floor surface F as best shown in FIGS. 1 and 2A.

Also, such vibrations are more considerable at a location vertically spaced a distance from the floor surface F than at a location close to the floor surface F. For this reason, with respect to the upper and lower front vibration suppressing units 11 on the front side of the machine tool, the viscoelastic body 12 in the upper front vibration suppressing unit 11 has a width that is preferably larger than that of the viscoelastic body 12 in the lower front vibration suppressing unit 11, so that a relatively high vibration suppressing effect can be obtained with the upper front vibration suppressing unit 11 positioned at the upper location where the vibrations are considerable.

Regarding the rear vibration suppressing unit 11 secured to the rear surfaces of the first and second machine beds 1 as best shown in FIG. 2C, such a rear vibration suppressing unit 11 is preferably positioned at a upper location where vibrations are considerable when considering the suppression of the vibrations, but even positioning of such rear vibration suppressing unit 11 at a lower location such as in the above described preferred embodiment of the present invention is effective to provide a desirable vibration suppressing effect and, moreover, such positioning at the lower location will not pose any problem associated with machine maintenance and checkout and the layout of peripheral equipments.

Although in describing the preferred embodiments of the present invention, upper and lower portions of the front surface of the two axis machine tool and a lower portion of the rear surface of such two axis machine tool have been shown and described as connected together through the two upper and lower front vibration suppressing units 11 and the single rear vibration suppressing unit 11, respectively, the number of connections made by the use of the vibration suppressing units 11 and the site of connection by the use of the vibration suppressing units 11 may not be necessarily limited to those shown and described, but may be suitably selected as desired depending on the characteristic of vibrations desired to be suppressed.

Also, if in consideration of the frequency of vibration desired to be suppressed, the thickness and the surface area of each of the viscoelastic bodies 12 in the vibration suppressing units 11 are suitably chosen, the propagation of the vibrations of the frequency desired to be suppressed can be effectively suppressed.

Yet, although the each of the vibration suppressing units 11 has been shown and described as preferably including the two plate members 13 and 14 with the viscoelastic body 12 intervening therebetween, the present invention is not necessarily limited thereto and each of the vibration suppressing units 11 may be constituted solely by, for example, a block shaped viscoelastic body, in which case such viscoelastic body may be bonded at its opposite ends to the two machine beds with the use of a bonding agent.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 ... Bed
2 ... Spindle (Processing machine)
3 ... Cutting mechanism (Processing machine)
11 ... Vibration suppressing unit
12 ... Viscoelastic body
13 ... First plate member
14 ... Second plate member

What is claimed is:

1. A two axis machine tool comprising:
   first and second machine beds independent of each other;
   first and second processing machines mounted on the first and second machine beds, respectively; and
   a vibration suppressing unit connecting the first and second machine beds with each other, the vibration suppressing unit including a viscoelastic body and suppressing vibrations; wherein
   the first and second machine beds are disposed on left and right sides of the machine tool, respectively,
   the vibration suppressing unit comprises a first plate member connected at a first end to the first machine bed and at a second end extending therefrom towards a center portion, and a second plate member connected at a first end to the second machine bed and at a second end extending therefrom towards a center portion and including an overlap region overlapping the second end of the first plate member while being spaced in a forward and rearward direction, and
   the viscoelastic element is fixed to the first and second plate members and sandwiched between the first and second plates, the viscoelastic element having an elongated shape longer in a leftward and rightward direction than in the forward and rearward direction.

2. The two axle machine tool as claimed in claim 1, wherein the machine tool is a parallel two axle lathing tool and the first and second processing machines on each of the first and second machine beds comprises a spindle extending in a forward and rearward direction.

3. A two axis machine tool comprising:
   first and second machine beds independent of each other;
   first and second processing machines mounted on the first and second machine beds, respectively; and
   a vibration suppressing unit connecting the first and second machine beds with each other, the vibration suppressing unit including a viscoelastic body and suppressing vibrations; wherein
   the vibration suppressing unit is disposed to bridge over front surfaces of the first and second machine beds and over rear surfaces of the first and second machine beads, respectively.

4. A two axis machine tool comprising:
   first and second machine beds independent of each other;
   first and second processing machines mounted on the first and second machine beds, respectively; and
   upper and lower vibration suppressing units connecting the first and second machine beds with each other, each of the upper and lower vibration suppressing units including a viscoelastic body and suppressing vibrations; wherein
   each of the upper and lower vibration suppressing units is disposed to bridge over front surfaces of the first and second machine beds and separated a distance from each other in a vertical direction, and
   the upper vibration suppressing unit has a vertical width greater than that of the lower vibration suppressing unit.

5. The two axle machine tool as claimed in claim 3, wherein the machine tool is a parallel two axle lathing tool and the first and second processing machines on each of the first and second machine beds comprises a spindle extending in a forward and rearward direction.

6. The two axle machine tool as claimed in claim 4, wherein the machine tool is a parallel two axle lathing tool and the first and second processing machines on each of the first and second machine beds comprises a spindle extending in a forward and rearward direction.

* * * * *